United States Patent [19]

Roark

[11] 4,084,580

[45] Apr. 18, 1978

[54] COMBINATION SOLAR COLLECTOR AND HEAT EXCHANGER

[76] Inventor: Charles Frederick Roark, 24 Maple La., Brownsburg, Ind. 46112

[21] Appl. No.: 709,379

[22] Filed: Jul. 28, 1976

[51] Int. Cl.² ............................................. F24J 3/02
[52] U.S. Cl. ..................... 126/271; 126/270
[58] Field of Search .............. 126/270, 271, 400; 237/1 A; 62/238, 2

[56] References Cited

U.S. PATENT DOCUMENTS

| | | | |
|---|---|---|---|
| 3,039,453 | 6/1962 | Andrassy | 126/271 |
| 3,299,881 | 1/1967 | Koch | 126/271 |
| 3,939,819 | 2/1976 | Minandi | 126/271 |
| 3,990,431 | 11/1976 | Mazzoni et al. | 126/271 |
| 3,991,937 | 11/1967 | Heilemann | 237/1 A |
| 3,995,613 | 12/1976 | Patil | 126/271 |
| 4,007,729 | 2/1977 | Chao et al. | 126/271 |
| 4,010,733 | 3/1977 | Moore | 126/271 |

FOREIGN PATENT DOCUMENTS 2,402,999 7/1975 Germany ..................... 126/271

*Primary Examiner*—John J. Camby
*Assistant Examiner*—Henry C. Yuen
*Attorney, Agent, or Firm*—Woodard, Weikart, Emhardt & Naughton

[57] ABSTRACT

A solar collector is provided with parallel spaced glass or plastic windows with a hermetic seal for the space between them, the inner window being spaced from a collector plate having a heat exchanger plate contiguous with the back, unlighted side of the collector plate. A pump provides circulation of absorber fluid in the collector plate and exchanger plate, while another pump provides circulation of a utilization fluid through the exchanger plate to the exterior of the assembly.

13 Claims, 4 Drawing Figures

COMBINATION SOLAR COLLECTOR AND HEAT EXCHANGER

BACKGROUND OF THE INVENTION

1. Field of the Invention

This invention relates generally to solar collectors and heat exchangers, and more particularly to a combination collector and heat exchanger in a single panel.

2. Description of the Prior Art

An item of literature showing prior art techniques is submitted herewith and is entitled "Baseline Solar Collector" apparently published by the PPG Industries, One Gateway Center, Pittsburgh, Pa. 15222 and bearing on the cover thereof a number G-483 15M35.

U.S. Pat. disclosing various types of solar energy receivers and/or utilization devices are as follows:

U.S. Pat. No. 2,405,118 — Delano et al
U.S. Pat. No. 2,969,788 — Newton
3,025,335 — Ralph
U.S. Pat. No. 3,125,091 — Sleeper
U.S. Pat. No. 3,179,105 — Falbel
U.S. Pat. No. 3,194,228 — Barques
U.S. Pat. No. 3,321,012 — Hervey
U.S. Pat. No. 3,391,688 — Dery
U.S. Pat. No. 3,906,927 — Caplan
U.S. Pat. No. 3,923,039 — Falbel A problem experienced in the use of conventional collectors has been the necessity for connecting the usual collector to a heat exchanger in which the energy absorbing fluid piped from the collector transfers heat energy to some other fluid for utilization. This has involved an undesirably large amount of plumbing and pipe fitting, together with the additional volume of heat absorbing fluid required to fill such plumbing, as well as the labor and materials in the piping and assembly thereof itself. It also has involved excessive opportunity for leakage and loss of comparatively expensive energy absorbing fluid.

SUMMARY

Described briefly, in a typical embodiment of the present invention, the functions of collection of solar energy and exchange of heat therefrom to a conventional utilization fluid are combined in a single unit. A collector member exposed to solar energy is provided with passages for conveying an energy absorbing fluid therethrough and in the same unit, a heat exchange member is provided with a passageway for conveying a solar energy absorbing fluid and a passageway for conveying an energy utilization fluid. Pumping means can be provided for both fluids.

DESCRIPTION OF THE PREFERRED EMBODIMENT

Figure 1:
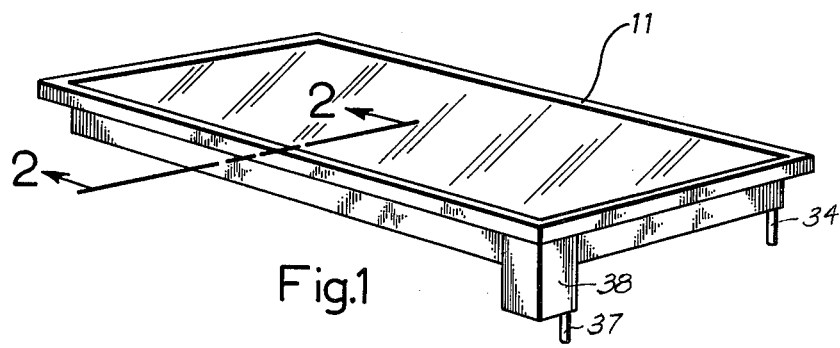
FIG. 1 is a perspective view of a combination solar collector and heat exchanger incorporating a typical embodiment of the present invention.
Figure 2:
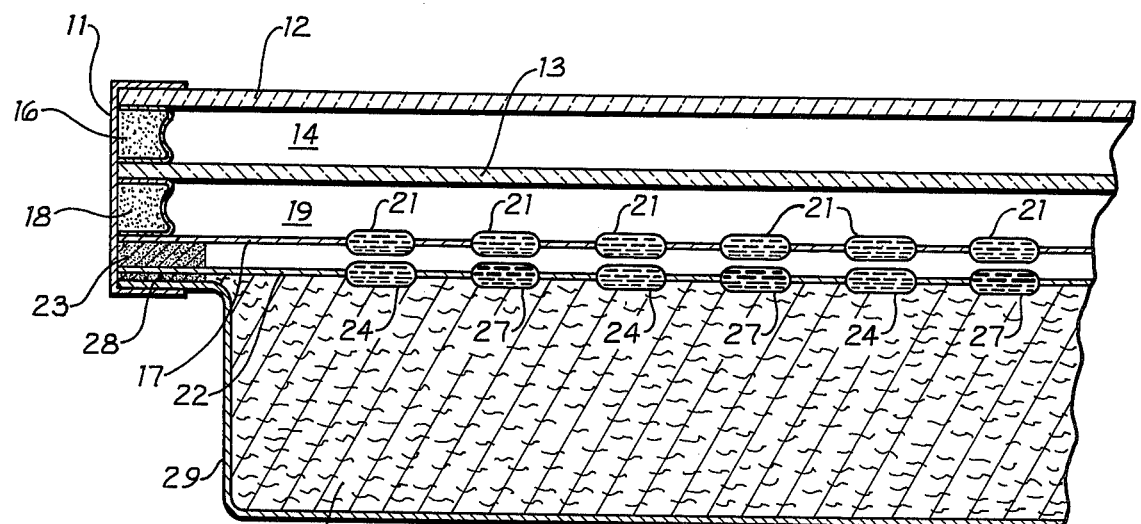
FIG. 2 is a fragmentary section therethrough taken as at lines 2—2 in FIG. 1 and viewed in the direction of the arrows.

Referring now to the drawings in detail, the panel may have a frame 11 with outer and inner window panes 12 and 13, respectively, with a dead air space between them at 14 and sealed completely around the perimeter of the windows by suitable combination spacer and seal members 16. These may be of a conventional desiccant-type.

The collector plate 17 is similarly spaced from the inner window pane 13 and a desiccant-type seal and spacer 18 are provided between them to seal the dead air space 19 in the same manner as space 14 is sealed. The collector plate 17 has therein a serpentine passageway which may be formed in conventional manner using the Olin-Brass Corporation "Roll Bond" construction known in the art. Passageway portions in the collector plate 17 are shown at 21, for example. This serpentine passageway is represented also in FIG. 3.

A heat exchanger plate 22 is secured in the structure under the collector plate and is spaced therefrom by a spacer 23 around the perimeter thereof. This also can be a desiccant-type of spacer. The heat exchanger plate has two serpentine therein, one of them being represented by the passages 24 for the energy absorber fluid which passes into the heat exchanger plate through a passageway 26 from the collector plate (FIG. 3); and utilization fluid passageway 27. The passageways 24 and 27 in the heat exchanger plate can be contiguous with those in the collector plate, if desired. On the other hand, if the exchanger plate will contain a utilization fluid which could freeze during certain periods at the installation site, due to low atmospheric temperatures, the exchanger plate can be spaced and insulated from the collector plate with glass fiber or other insulating material. This is shown in FIG. 4 where the extra deep frame and perimeter insulation are shown at 11' and 23' respectively, and the fill insulation is 42.

A spacer 28 is provided between the heat exchanger plate and the insulation cover 29 which is secured to the frame 11 at the rear of the unit and contains the insulating material 31 which may be of glass fiber or other suitable type.

Figure 3:
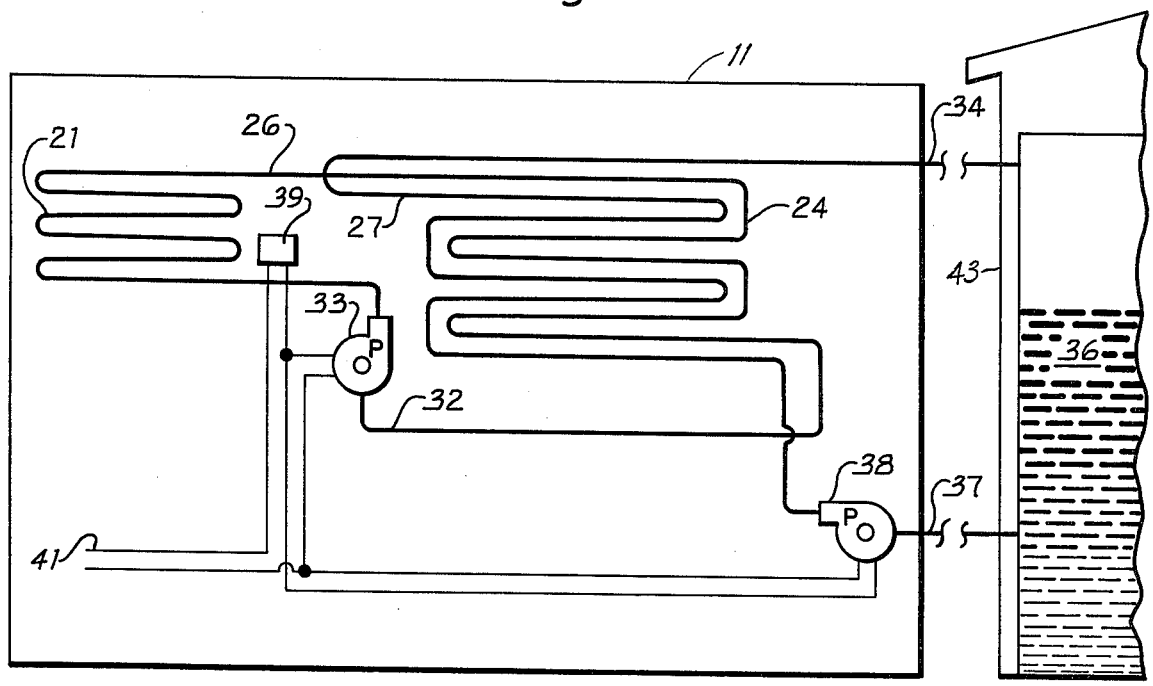
FIG. 3 is a combination hydraulic and electrical schematic diagram of the apparatus of FIGS. 1 and 2, and including pumps and a hot water storage tank.
Figure 4:
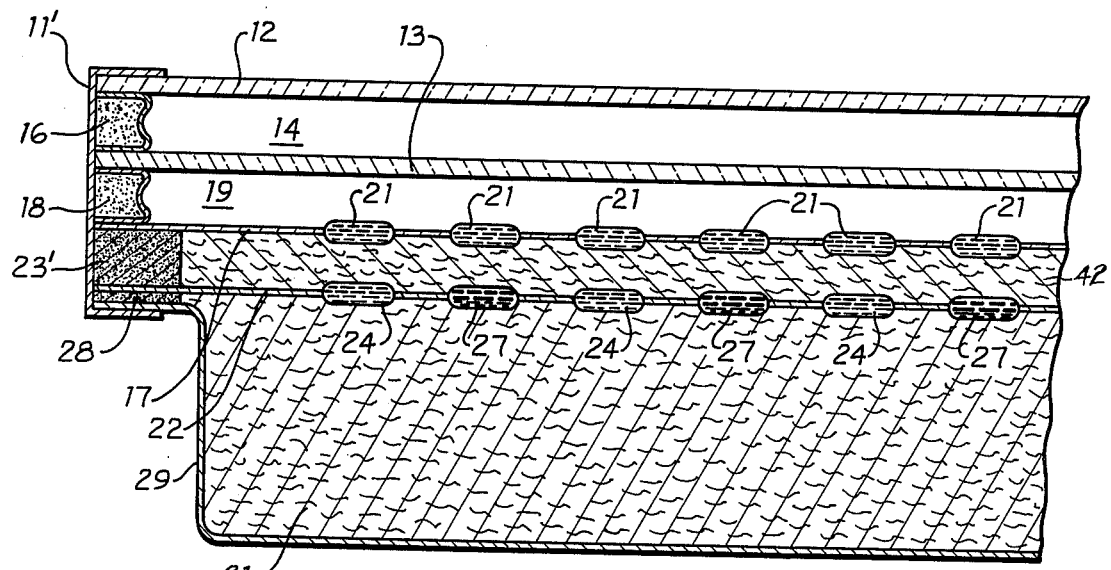
FIG. 4 is similar to FIG. 2 except that it shows an alternate construction.

As shown in FIG. 3, the absorber fluid (sometimes referred to as "working fluid" or "heat transfer fluid") is contained in a complete circuit ("primary loop") from the collector plate passageway 21 through the connection 26 to the exchanger plate passageway 24 and then back through tubing 32 and pump 33 to the collector plate. Similarly, the utilization fluid passageway ("utilization fluid loop") is from the exchanger plate passageway 27 through tubing 34 to a storage tank 36 and back from the storage tank through tube 37 to the pump 38. These pumps may be wired in parallel to a temperature sensor switch 39 supplied by electrical energy from a 110 or 220 volt supply, for example, at inputs 41. The storage tank is shown in a building (shown on a much reduced scale for convenience in drawing) at a location remote from the exterior sunlit environment where the collector/heat exchanger will be located and oriented, for example, to sunlight.

The windows may be of glass or plastic. The collector and heat exchanger plates are preferably made of copper, and a suitable black coating can be applied to increase the absorber capability on the lighted face of the collector plate. 17. The absorber fluid may be distilled water or a mixture of distilled water and ethylene glycol, where freezing temperatures are anticipated. Another absorber fluid which is suitable is known as a "Dowtherm J" material as furnished by the Dow Chemical Co. The utilization fluid may be water or a mixture of water with ethylene glycol or other antifreeze. These are examples, and other materials might also be used. It is possible that in some instances, one or both pumps may be eliminated, if one can rely on convection currents in the passageways to provide the desired circulation. Otherwise a sensor 39 located on the collector plate and responsive to a temperature over a predetermined level can be employed to energize the pumps when circulation of heated absorber medium from the collector plate through the heat exchanger plate is appropriate. The utilization fluid stored in tank 36 can be used for a variety of purposes, such as space heating, for heat transfer to other devices, hot water utilization for processing, or for other purposes. If hot water is utilized directly out of the storage tank 36 for processing, cooking, etc., a make-up water source should be provided.

Although the collector and heat exchanger plates of the "Roll Bond" brand may be used, those from other manufacturers and using other manufacturing techniques might also be used. In addition, the particular type of heat exchanger disclosed herein might also be used to perform refrigeration with a utilization fluid. For example, the plate having the single serpentine passageway therein could be used for "Dowtherm J" and the heat exchanger plate used for circulating "Dowtherm J" and a refrigerant separately through the separate passageways therein. Ammonia or some other suitable refrigerant might be used in the utilization fluid loop.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A solar energy collector/heat exchanger assembly comprising:
    a frame;
    first and second window panes secured in said frame in parallel spaced relation and having a dry gas filled and sealed space between them for thermal insulation betweeen them;
    a collector panel secured in said frame under and in parallel spaced relation to said second window pane and having a first passageway therein for a working fluid;
    a heat exchanger panel secured in said frame in parallel spaced relation to said collector panel and having a second passageway therein for said working fluid and a third passageway therein for a utilization fluid;
    and means coupling said first and second passageways together to make a working fluid circuit in said frame whereby heat energy collected in said working fluid in said collector panel is made available for heat exchange to said utilization fluid in said heat exchanger panel.

2. The assembly of claim 1 and further comprising:
    coupling means at opposite ends of said utilization fluid passageway for connection to means for utilizing thermal energy collected by said working fluid.

3. The assembly of claim 1 wherein:
    said collector panel and said second window have a dry gas filled and sealed space between them for thermal insulation between them.

4. The assembly of claim 1 and further comprising:
    thermal insulating material in said frame behind said heat exchanger panel to impede heat transfer from said heat exchanger panel to the environment of the assembly.

5. The assembly of claim 4 wherein said heat exchanger panel is spaced behind said collector panel, said assembly further comprising:
    thermal insulating material in said space between said collector panel and said heat exchanger panel to impede heat transfer from said heat exchanger panel to said collector panel.

6. In solar energy systems including window means for admitting sunlight and collector means exposed by said window means to the sunlight and having a working fluid therein, the improvement comprising:
    heat exchanger means associated with said collector means for reception of the working fluid from the collector means for transfer of heat energy from said working fluid and then return of said working fluid to said collector means,
    said heat exchanger means comprising a utilization fluid passageway for a utilization fluid whereby heat transferred from said working fluid in said heat exchanger means is transferred to said utilization fluid,
    said collector means including a first panel having a first passageway therein for said working fluid, and said heat exchanger means including a second panel spaced from said first panel and having a second passageway therein for said working fluid, said first and second passageways being coupled together to provide a working fluid circuit, the improvement further comprising:
    first pump means in the circuit for said working fluid, for pumping said working fluid through said collector means and said heat exchanger means;
    and second pump means coupled to the passageway for the utilization fluid in said heat exchanger means and operable, when actuated, to pump said utilization fluid through said heat exchanger means.

7. The improvement of claim 3 wherein: insulation means fills the space between said first and second panels.

8. The improvement of claim 7 and further comprising:
    tubes coupled to said utilization fluid passageway and to a storage tank remote from said panels to provide a utilization fluid circuit.

9. The improvement of claim 8 wherein:
    the utilization fluid storage tank is in a building interior remote from an exterior environment site of the collector and heat exchanger means.

10. The improvement of claim 8 wherein:
    said second pump means is in said utilization fluid circuit.

11. The improvement of claim 10 wherein:
    said utilization fluid circuit is filled with a refrigerant.

12. The improvement of claim 10 wherein:
    said utilization fluid circuit is filled with distilled water as the utilization fluid.

13. The improvement of claim 12 wherein:
    said working fluid circuit is filled with an energy absorbing working fluid nonfreezable in the normal exterior environmental site of said window means.

* * * * *